June 21, 1927. S. A. HOGE 1,633,252
SIGNALING APPARATUS FOR MOTOR VEHICLES
Filed Nov. 10, 1924
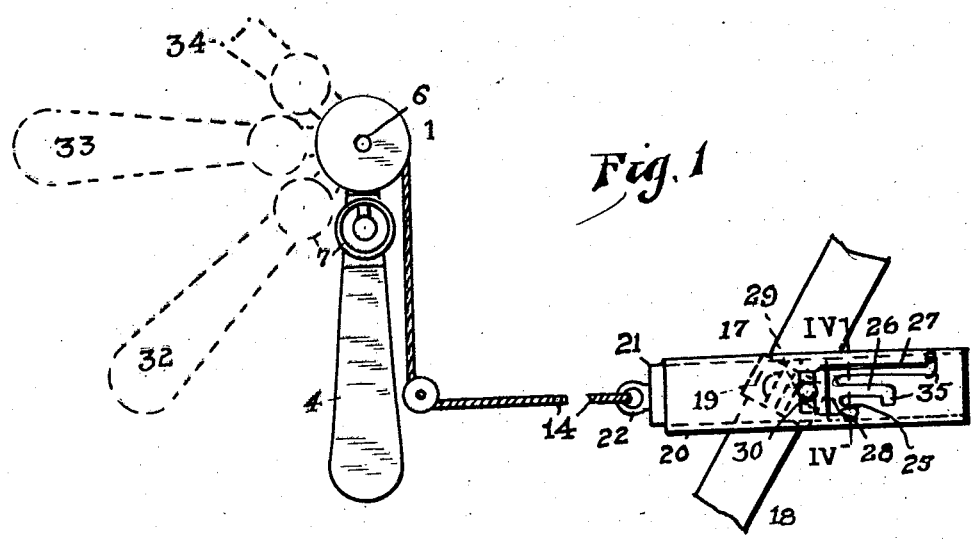
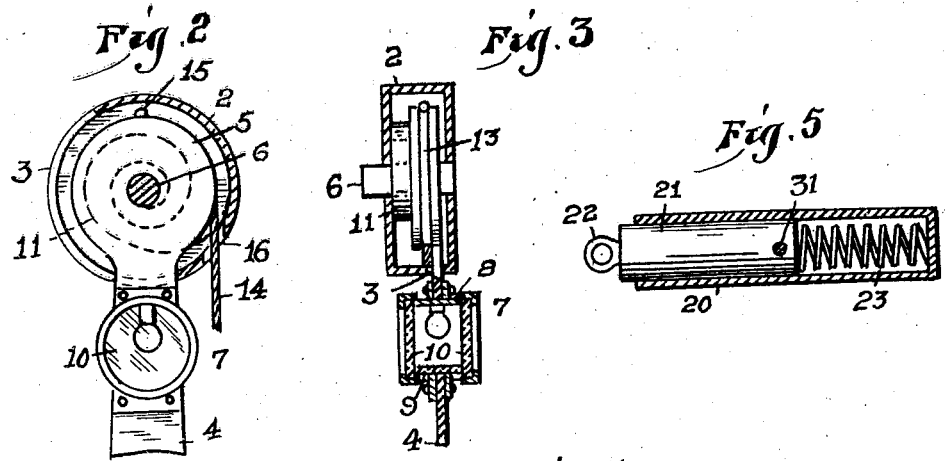
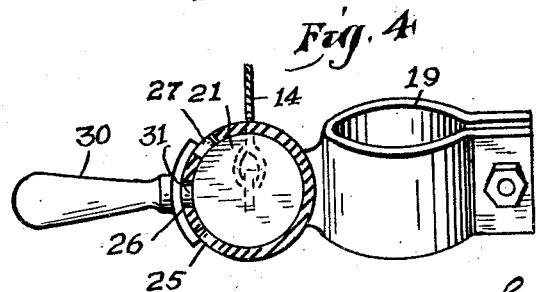
INVENTOR
Smith A. Hoge
By Jack Snyder
Attorney Patented June 21, 1927.

1,633,252

UNITED STATES PATENT OFFICE.

SMITH A. HOGE, OF RICES LANDING, PENNSYLVANIA.

SIGNALING APPARATUS FOR MOTOR VEHICLES.

Application filed November 10, 1924. Serial No. 748,870.

My invention relates to signaling apparatus for motor vehicles, and the primary object thereof is to provide a device of the character described, whereby the driver of an automobile can signal to approaching, following and passing vehicles his intended movements, thereby avoiding confusion and minimizing accident hazards ordinarily concomitant with the operation of speeding motor vehicles.

Further objects of the invention are to provide a signaling apparatus of the class stated, in a manner as hereinafter set forth, which is simple in its construction and arrangement, strong, durable and efficient in its use, compact and readily installed to an automobile of any construction, conveniently operable, positive in its action, attractive in appearance, which embodies means for illumination of the device at night, and which is comparatively inexpensive to manufacture and install.

To the accomplishment of these and such other objects as may hereinafter appear, the invention consists of the novel construction, combination and arrangement of parts herein specifically described and illustrated in the accompanying drawing wherein is shown an embodiment of the invention, but it is to be understood that the device shown is merely illustrative and that various changes in the form, proportion, and minor details of construction may be resorted to without departing from the principle or sacrificing any of the advantages of the invention which come within the scope of the claim hereunto appended.

In the drawing forming a portion of this specification and wherein like numerals of reference designate corresponding parts throughout the several views:—

Figure 1 is a diagrammatic view of a signaling apparatus in accordance with my invention.

Figures 2 and 3 are sectional views of the arm support and associated parts.

Figure 4 is a sectional view on line IV—IV, Figure 1.

Figure 5 is a side view of the arm shifting mechanism with the cylindrical casing thereof shown in cross section.

Referring in detail to the drawing 1 denotes a circular hollow support adapted to be fixed vertically edgewise to the side of a motor vehicle in any suitable manner. The outer portion of the side wall 2, of the support 1, is formed with a slot 3 which extends circumferentially approximately one-half the distance around the support side wall 2.

A signaling arm 4, provided at its inner end with a head 5, is pivotally mounted in the support 1 on the fixed pin 6, and extends through the slot 3 in the support side wall 2. The movement of the arm 4 is limited to the length of the slot 3, and when the former is in the vertically depending or inoperative position it will rest against the lower end of the slot 3, and when it is in the upper inclined position it will engage the upper end of the slot 3.

A lamp 7, suitably connected with an electric circuit, is fixedly mounted to the arm 4, adjacent to the inner end thereof, and includes a casing 8, the outer portion of which is formed with a transparent wall 9 to permit of the projection of the light therethrough for the purpose of illuminating the arm 4 to make the latter discernible at night. It will be noted that the lamp 7 can also be utilized to serve as a tail and parking light as it is provided with a lens 10 at each end thereof, whereby the light will be projected both rearwardly and forwardly. The color of the transparent wall 9 and of the lenses 10 may be varied to best meet regulations and conditions found in practice.

A spring 11 is mounted in the support 1 and has one end thereof fixed to the pin 6 and the other end to the head 5, for normally returning and maintaining the arm 4 in the vertically depending or inoperative position.

The inner peripheral edge portion of the head 5 is provided with a groove 13 which acts as a guide for the flexible pull member 14. One end of the latter is attached to the peripheral edge of the head 5 at a point diametrically aligned to the arm 4, as indicated at 15. The support side wall 2 is formed with a suitably disposed aperture 16 to provide for the passage and operation of the pull member 14, therethrough in a manner to be described.

An arm operating mechanism 17 is fixedly secured in the horizontal position to the steering column 18 of the motor vehicle, by means of the clamping bracket 19. The operating mechanism 17 comprises a cylindrical casing 20, closed at its rear end and open at its front end. A slide 21, formed at its front end with an eye 22 for the attachment of the pull member 14, is shiftably mounted in the cylindrical casing 20. A spring 23 is mounted in the casing 20, one end of which abuts against the rear closed end of the casing 20 and the other end thereof abuts against the rear end of the slide 21. The action of the spring 23 normally tends to force the slide 21 forwardly in the casing 20.

The cylindrical casing 20 is formed with three horizontally extending parallel disposed slots indicated at 25, 26, and 27 respectively. The slot 26 is of greater length than the slot 25, and the slot 27 is of greater length than the slot 26. The rear end of each of the slots 25, 26, and 27 is closed and is formed with a right angularly disposed slot portion 35 for the purpose to be described.

The forward end of each of the slots 25, 26, and 27 open into a common aperture 28 formed to provide a converged forward end 29. A laterally disposed operating handle 30 is fixed to the slide 21 by means of the handle shank 31, which is adapted to travel in the slots 25, 26, and 27.

In practice the operation of the device is as follows:—

Assuming that all parts of the apparatus are in the positions shown in Figure 1, of the drawing, the support 1 is fixed to the side of the motor vehicle with the arm 4 in the vertically depending or inoperative position. The arm operating mechanism 17 is fixed to the steering column 18 of the motor vehicle with the slide 21, thereof, in the forward position. The shank 31 of the handle 30 is engaged in the converged forward end 29 of the casing aperture 28 thereby limiting the forward movement of the slide 21. The flexible pull member 14 is arranged to establish a taut shiftable connection between the arm head 5 and the slide 21. The concerted action of the springs 11 and 23 will normally maintain the arm 4 in the inoperative position and the handle 30 positioned at the converged forward end 29 of the aperture 28.

If the operator desires to indicate a turn to the left, he will shift the handle 30 into the short slot 25, thereby drawing back the slide 21 and shifting the arm 4 to the angular position indicated in dash lines at 32. By positioning the handle 30 into the slot 26 the arm 4 will be shifted to the horizontal or stop position as indicated at 33, and by positioning the handle 30 into the long slot 27 the arm will shift to the angular position indicated at 34 and will denote an intended to turn to the left.

If it is desired to hold any signal, the device may be locked in the signaling position, by shifting the handle shank 31 into the angular slot portion 35 or respective slots 25, 26 or 27.

By providing the converged forward end 29 of the aperture 28, the handle 30 will automatically assume a position horizontally aligned with slot 26. As the latter is engaged when shifting the arm 4 to the most frequently used position. i. e. the stop position, as indicated at 33, such engagement is facilitated and requires but a straight rearward pull on the handle 30 and the latter need not be partially turned as when being drawn into the slots 25 and 27 to indicate other right or left turn signals.

The length of the slots 25, 26 and 27 determines the distance of the pull permitted for positioning the arm 4 to the respective signaling positions, and consequently each is constructed to permit only the travel of the handle shank 31 therein to the distance required to actuate the slide 21 and pull member 14 to properly position the arm 4 to indicate the signal intended.

What I claim is:

In combination, an operating mechanism for motor vehicle signals, comprising a cylindrical casing being adapted to be fixed to the steering column of the vehicle and disposed horizontally to extend longitudinally relatively to the vehicle, said casing being closed at its rear end and open at its forward end, said cylinder formed with a plurality of parallel disposed slots of different lengths extending longitudinally and opening at their forward ends into a common aperture, said aperture converging toward its forward end, a slide member mounted in said casing and longitudinally and rotatably shiftable in the latter, a laterally disposed operating handle provided with a shank, said shank extending through said aperture and fixedly secured to said slide member, said slide member normally disposed in the forward end of said casing, a spiral spring mounted in said casing and engaging the rear end of the said slide member and the rear end of the casing for normally maintaining said slide member in the forward end of the said casing, each of said slots having its rear end formed with a right angularly disposed slot portion, said shank adapted for travel in each of said slots for retracting said slide member in said casing and for engagement in associated slot portions for maintaining said slide member in the retracted position in said casing, and a flexible member secured to the forward end of said slide member and being adapted to be attached to the vehicle signal, substantially as described and for the purpose set forth.

In testimony whereof I affix my signature.

SMITH A. HOGE.